(12) United States Patent
Wang et al.

(10) Patent No.: US 10,573,457 B2
(45) Date of Patent: Feb. 25, 2020

(54) EMBEDDED MAGNETIC COMPONENT TRANSFORMER DEVICE

(71) Applicant: Murata Manufacturing Co., Ltd., Nagaokakyo-shi, Kyoto-fu (JP)

(72) Inventors: Jing Wang, Milton Keynes (GB); Quinn Kneller, Milton Keynes (GB); Scott Parish, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 680 days.

(21) Appl. No.: 14/883,855

(22) Filed: Oct. 15, 2015

(65) Prior Publication Data
US 2016/0111965 A1 Apr. 21, 2016

(30) Foreign Application Priority Data
Oct. 17, 2014 (GB) .................................... 1418465.9

(51) Int. Cl.
*H01F 5/00* (2006.01)
*H01L 27/08* (2006.01)
(Continued)

(52) U.S. Cl.
CPC ........... *H01F 41/041* (2013.01); *H01F 19/06* (2013.01); *H01F 27/2804* (2013.01);
(Continued)

(58) Field of Classification Search
CPC . H01F 2019/13; H01F 27/324; H01L 23/645; H01L 28/10
(Continued)

(56) References Cited

U.S. PATENT DOCUMENTS 5,070,317 A 12/1991 Bhagat
6,445,271 B1 * 9/2002 Johnson .............. H01F 17/0033
257/531
(Continued)

FOREIGN PATENT DOCUMENTS

EP  0 809 263 A1  11/1997
WO  2008/060551 A2  5/2008
(Continued)

OTHER PUBLICATIONS

Parish et al.; "Embedded Magnetic Component Device"; U.S. Appl. No. 14/825,327, filed Aug. 13, 2015.
(Continued)

*Primary Examiner* — Elvin G Enad
*Assistant Examiner* — Joselito Baisa
(74) *Attorney, Agent, or Firm* — Keating & Bennett, LLP

(57) ABSTRACT

An embedded transformer device includes first, second, and auxiliary windings, defined in an insulating substrate by conductive vias joined together by conductive traces. The positions of the conductive vias are arranged to optimize the isolation properties of the transformer and to reduce the coupling of the transformer by increasing the leakage inductance. The embedded transformer device provides better isolation between input side and output side windings, and allows an oscillating LC circuit to be set up in the case of a short circuit, preventing high power from extending between the input and output terminals and thereby avoiding damage to the connected electrical components.

20 Claims, 7 Drawing Sheets

(51) Int. Cl.
  *H01F 41/04* (2006.01)
  *H01F 27/28* (2006.01)
  *H01F 19/06* (2006.01)
  *H02M 3/335* (2006.01)
  *H02M 3/337* (2006.01)
  *H02M 1/00* (2006.01)

(52) U.S. Cl.
  CPC ..... *H01F 2027/2809* (2013.01); *H02M 3/337* (2013.01); *H02M 3/33538* (2013.01); *H02M 2001/0058* (2013.01); *Y02B 70/1491* (2013.01)

(58) Field of Classification Search
  USPC .......................................... 336/200; 257/531
  See application file for complete search history.

(56) References Cited

U.S. PATENT DOCUMENTS

| | | | | |
|---|---|---|---|---|
| 7,009,486 | B1* | 3/2006 | Goeke | H01F 27/2804 336/229 |
| 7,196,607 | B2* | 3/2007 | Pleskach | H01F 17/0033 257/E23.062 |
| 7,489,226 | B1* | 2/2009 | Chignola | H01F 27/2804 336/229 |
| 7,513,031 | B2* | 4/2009 | Pleskach | H01F 17/0033 156/250 |
| 7,549,222 | B2* | 6/2009 | Nakamura | H05K 1/0222 29/825 |
| 7,579,824 | B2* | 8/2009 | Rea | G01R 15/181 324/117 R |
| 7,671,716 | B2* | 3/2010 | Chen | H01F 17/0033 336/200 |
| 7,821,374 | B2* | 10/2010 | Harrison | H01F 19/04 336/192 |
| 8,466,769 | B2* | 6/2013 | Dalmia | H01F 17/0006 336/200 |
| 8,823,480 | B2* | 9/2014 | Dalmia | H01F 5/003 336/182 |
| 8,860,543 | B2* | 10/2014 | Schaffer | H01F 17/0033 336/200 |
| 9,959,967 | B2* | 5/2018 | Lee | H01F 19/00 |
| 2002/0017399 | A1* | 2/2002 | Chang | H01L 23/49827 174/262 |
| 2002/0037434 | A1 | 3/2002 | Feygenson et al. | |
| 2004/0212475 | A1 | 10/2004 | Schumacher | |
| 2011/0108317 | A1 | 5/2011 | Harrison et al. | |
| 2011/0285492 | A1* | 11/2011 | Wang | H01F 27/306 336/198 |
| 2012/0194314 | A1* | 8/2012 | Mo | H05K 1/165 336/200 |
| 2014/0043130 | A1* | 2/2014 | Dalmia | H01F 17/0006 336/200 |
| 2014/0266549 | A1 | 9/2014 | Huang et al. | |
| 2015/0101854 | A1* | 4/2015 | Lee | H01F 27/2804 174/260 |

FOREIGN PATENT DOCUMENTS

| | | |
|---|---|---|
| WO | 2010/004491 A1 | 1/2010 |
| WO | 2011/026706 A1 | 3/2011 |

OTHER PUBLICATIONS

Kneller et al.; "Embedded Magnetic Component Device"; U.S. Appl. No. 14/825,332, filed Aug. 13, 2015.
Francis; "Embedded Magnetic Component Transformer Device"; U.S. Appl. No. 14/883,854, filed Oct. 15, 2015.
Kneller; "Embedded Magnetic Component Transformer Device"; U.S. Appl. No. 14/883,859, filed Oct. 15, 2015.
Kneller; "Embedded Magnetic Component Transformer Device"; U.S. Appl. No. 14/883,863, filed Oct. 15, 2015.
Wang et al.; "Embedded Magnetic Component Transformer Device"; U.S. Appl. No. 14/883,866, filed Oct. 15, 2015.
Kneller et al.; "Embedded Magnetic Component Transformer"; U.S. Appl. No. 15/019,240, filed Feb. 9, 2016.
Parish et al.; "Embedded Magnetic Component Device"; U.S. Appl. No. 15/054,412, filed Feb. 26, 2016.
Lloyd; "Embedded Magnetic Component"; U.S. Appl. No. 15/049,414, filed Feb. 22, 2016.
Harber; "Embedded Magnetic Component Device"; U.S. Appl. No. 15/050,536, filed Feb. 23, 2016.
Official Communication issued in International Patent Application No. GB1418465.9, dated Apr. 27, 2015.
Kneller et al., "Multi-Tap Winding Design For Embedded Transformer", U.S. Appl. No. 15/498,765, filed Apr. 27, 2017.
Francis, "Power Electronics Device With Improved Isolation Performance", U.S. Appl. No. 15/498,769, filed Apr. 27, 2017.
Kneller et al., "DC-DC Converter Device", U.S. Appl. No. 15/703,086, filed Sep. 13, 2017.

* cited by examiner

EMBEDDED MAGNETIC COMPONENT TRANSFORMER DEVICE

BACKGROUND OF THE INVENTION

1. Field of the Invention

The present invention relates to an embedded magnetic component transformer device, and in particular to an embedded magnetic component transformer devices with reduced coupling and improved isolation properties.

2. Description of the Related Art

It is known, for example, in US 2011/0108317 A1, to provide low profile transformers and inductors in which the magnetic components are embedded in a cavity in a resin substrate, and the necessary input and output electrical connections for the transformer or inductor are formed on the substrate surface. A printed circuit board (PCB) for a power supply device can then be formed by adding layers of solder resist and copper plating to the top and/or bottom surfaces of the substrate. The necessary electronic components for the device may then be surface mounted on the PCB.

Compared to conventional transformers, an embedded design allows a significantly thinner and more compact device to be built. This is desirable because typically the space available for mounting the transformer device onto a PCB, for example, a motherboard of an electronics device, will be very limited. A transformer component with a smaller footprint will therefore enable more components to be mounted onto the PCB, or enable the overall size of the PCB and therefore the entire device to be reduced.

When reducing the size of the transformer device, the gap between adjacent turns on a transformer winding are likely to be provided more closely together, and the gap between separate windings provided on the transformer will also be reduced. This reduces the ease with which a magnetic field, set up in the transformer during use, can escape from the transformer core and therefore results in a stronger coupling, via the magnetic field, between the separate windings provided on the core. Another consequence of reducing the gap between adjacent turns is an increase in the capacitance existing between adjacent conducting components which include the transformer windings. Such increased coupling between the windings via the magnetic field they generate, and such increased distributed capacitance throughout the transformer, are not desirable properties for a transformer in certain applications.

Furthermore, reducing the transformer size can result in safety considerations, particularly if two separate windings sharing a common transformer core are to handle high voltages. Such a transformer is used in power electronics applications and power converter technology, for example. In this case, the windings must be electrically isolated from one another. A smaller transformer will tend to reduce the distance between electrically isolated windings, meaning that the electrical isolation is less robust against failure by electrical arcing and reducing the maximum voltages that the transformer windings can safely handle.

The electrical isolation can be increased to a safe level by using a multi-layer PCB arrangement with different windings provided on different PCB layers, by providing a cover on the transformer core, or by coating the windings in a conformal coating or other sort of insulating material such as insulating tape. Triple insulated wire can also be used. However, all of these techniques have the disadvantage that the embedded magnetic component transformer device must be made larger to accommodate the extra PCB layers or the thicker insulation on the windings and/or core.

It would be desirable to provide an embedded transformer device having reduced coupling between the coils and improved isolation characteristics, and to provide a method for manufacturing such a device.

SUMMARY OF THE INVENTION

A preferred embodiment of the present invention provides an embedded transformer device including: an insulating substrate including a first side and a second side opposite the first side, and including a cavity therein, the cavity including an inner and an outer periphery; a magnetic core housed in the cavity including a first section and a second section; a first winding, extending through the insulating substrate and around the first section of the magnetic core; a second winding, extending through the insulating substrate and around the second section of the magnetic core. Each of the first and second windings include: upper conductive traces located on the first side of the insulating substrate; lower conductive traces located on the second side of the insulating substrate; inner conductive connectors extending through the insulating substrate adjacent to the inner periphery of the magnetic core, the inner conductive connectors respectively defining electrical connections between respective upper conductive traces and respective lower conductive traces; and outer conductive connectors extending through the insulating substrate adjacent to the outer periphery of the magnetic core, the outer conductive connectors respectively defining electrical connections between respective upper conductive traces and respective lower conductive traces. The inner conductive connectors of the first winding are arranged in a plurality of curved rows, each curved row being positioned at a constant or substantially constant distance from the inner periphery of the cavity. The inner conductive connectors of the second winding are arranged in a first curved row positioned at a constant or substantially constant distance from the inner periphery of the cavity, and the constant or substantially constant distance being large enough to allow a second curved row of inner conductive connectors to be accommodated between the first curved row and the inner periphery of the cavity. The outer conductive connectors of the second winding are arranged in a first curved row positioned at a constant or substantially constant distance from the outer periphery of the cavity, and the constant or substantially constant distance being large enough to allow a second curved row of outer conductive connectors to be accommodated between the first curved row and the outer periphery of the cavity.

The inner conductive connectors of the first winding on the curved row closest to the inner periphery of the cavity may be arranged on a first circular or substantially circular arc having a first radius; the inner conductive connectors of the second winding on the first curved row may be arranged on a second circular or substantially circular arc, concentric to the first circular or substantially circular arc, having a second radius; and the first radius may be greater than the second radius.

The first winding may be spaced apart from the second winding so that electrical isolation is provided between the first winding and the second winding.

The embedded transformer device may further include: a first isolation barrier located on the first side of the insulating substrate, covering at least a portion of the first side between the first winding and the second winding where the first winding and second winding are closest, and defining a solid bonded joint with the first side of the insulating substrate; and a second isolation barrier located on the second side of the insulating substrate covering at least a portion of the second side between the first winding and the second winding where the first winding and second winding are closest, and defining a solid bonded joint with the second side of the insulating substrate.

The embedded transformer device may further include: an auxiliary winding, extending through the insulating substrate and around the magnetic core, the auxiliary winding including: upper conductive traces located on the first side of the insulating substrate; lower conductive traces located on the second side of the insulating substrate; inner conductive connectors extending through the insulating substrate adjacent to the inner periphery of the magnetic core, the inner conductive connectors respectively forming electrical connections between respective upper conductive traces and respective lower conductive traces; and outer conductive connectors extending through the insulating substrate adjacent to the outer periphery of the magnetic core, the inner conductive connectors respectively defining electrical connections between respective upper conductive traces and respective lower conductive traces; wherein the inner conductive connectors of the auxiliary winding are arranged in a plurality of curved rows, each curved row being positioned at a constant or substantially constant distance from the inner periphery of the cavity.

The auxiliary winding may be spaced apart from the second winding so that electrical isolation is provided between the auxiliary winding and the second winding.

The electrical isolation may be provided by the minimum of: the minimum distance of separation between the first winding and the second winding; and the minimum distance of separation between the second winding and the magnetic core.

The constant or substantially constant distance being large enough to allow a second curved row of outer conductive connectors to be accommodated may increase the leakage inductance of the transformer.

A leakage inductance of the transformer and a distributed capacitance of the transformer windings may define a high-frequency oscillating LC circuit, operable to limit the power transfer between the first and second windings when a short circuit occurs.

A power converter including the embedded transformer device may be provided.

The power converter may further include circuitry to energize the transformer windings, wherein the circuitry is a Royer circuit.

A preferred embodiment of the present invention provides an embedded transformer device including: an insulating substrate including a first side and a second side opposite the first side, and including a cavity therein, the cavity including an inner and an outer periphery; a magnetic core housed in the cavity including a first section and a second section; a first winding, extending through the insulating substrate and around the first section of the magnetic core; a second winding, extending through the insulating substrate and around the second section of the magnetic core; each of the first and second windings including: upper conductive traces located on the first side of the insulating substrate; lower conductive traces located on the second side of the insulating substrate; inner conductive connectors extending through the insulating substrate adjacent to the inner periphery of the magnetic core, the inner conductive connectors respectively defining electrical connections between respective upper conductive traces and respective lower conductive traces; and outer conductive connectors extending through the insulating substrate adjacent to the outer periphery of the magnetic core, the outer conductive connectors respectively defining electrical connections between respective upper conductive traces and respective lower conductive traces. The inner conductive connectors of the first winding are arranged in one or more curved rows, each curved row being positioned at a constant or substantially constant distance from the inner periphery of the cavity. The inner conductive connectors of the second winding are arranged in one or more curved rows, each curved row being positioned at a constant or substantially constant distance from the inner periphery of the cavity. The minimum distance between the inner conductive connectors of the second winding and the magnetic core is greater than the minimum distance between the inner conductive connectors of the first winding and the magnetic core.

Preferred embodiments of the present invention also include corresponding methods of manufacture.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention include an embedded magnetic component transformer device including first, second, and auxiliary windings extending around a magnetic core embedded in a substrate. The embedded magnetic component transformer device may advantageously be used as a portion of switching power electronic devices, such as a Royer circuit. A first preferred embodiment of the present invention is illustrated in FIGS. 2 to 6 which will be discussed in detail below.

For ease of understanding, an example method of manufacturing an embedded magnetic component transformer device will now be described with reference to FIGS. 1A to 1F. Techniques for manufacturing an embedded magnetic component transformer device are described in UK patent applications GB 1414469.5 and GB 1414468.7 filed by the present applicant, the entire contents of which are incorporated herein by reference.

Figure 1A:
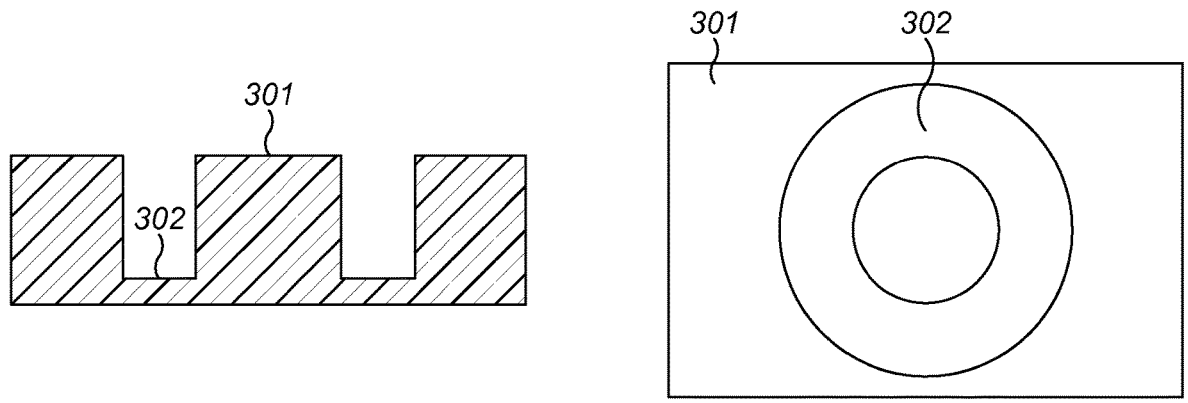
FIGS. 1A to 1G illustrate an example technique for manufacturing an embedded magnetic component device.

In a first step of the method, illustrated in FIG. 1A, a circular annulus or cavity 302 for housing a magnetic core is routed in an insulating substrate 301. In this example, the insulating substrate is formed of a resin material, such as FR4. FR4 is a composite 'pre-preg' material composed of woven fiberglass cloth impregnated with an epoxy resin binder. The resin is pre-dried, but not hardened, so that when it is heated, it flows and acts as an adhesive for the fiberglass material. FR4 has been found to have favorable thermal and insulation properties.

Figure 1B:
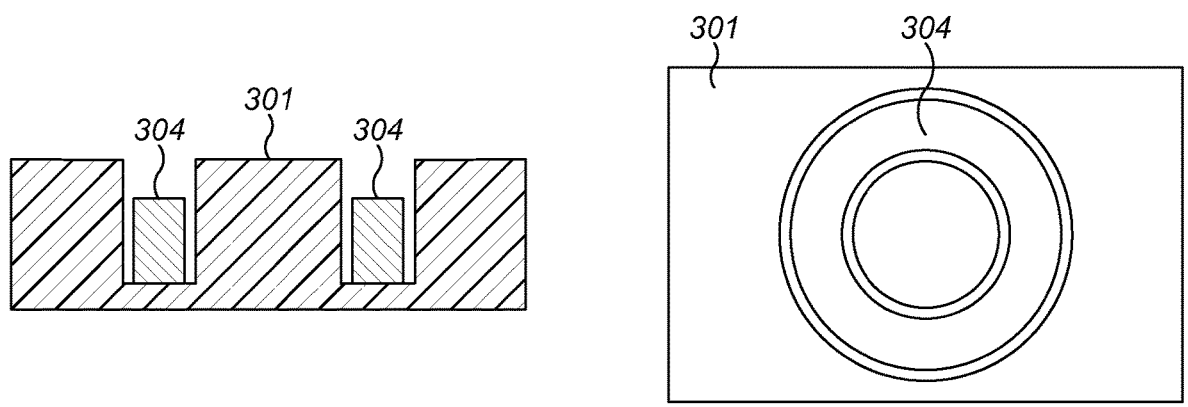

As shown in FIG. 1B, a circular magnetic core 304 is then installed in the cavity 302. The cavity 302 may be slightly larger than the magnetic core 304, so that an air gap may exist around the magnetic core 304. The magnetic core 304 may be installed in the cavity manually or by a surface mounting device such as a pick and place machine.

Figure 1C:
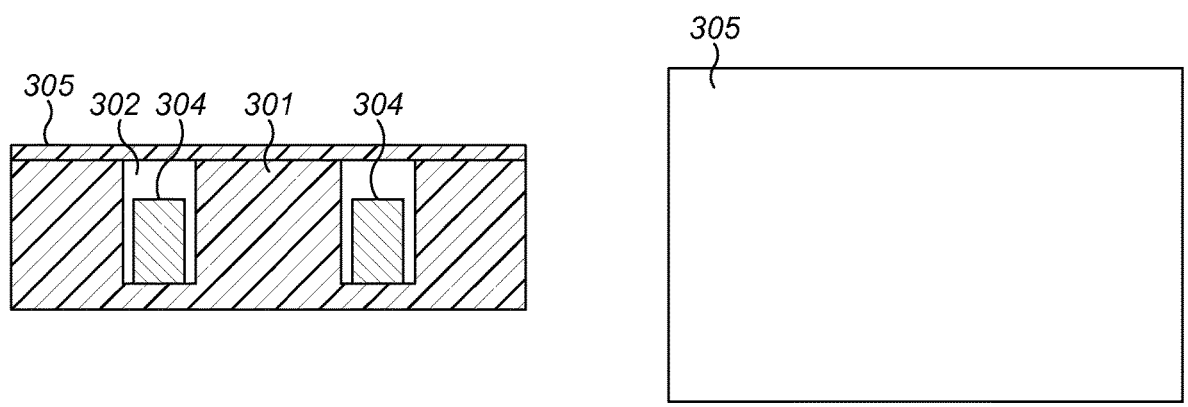

In the next step, illustrated in FIG. 1C, a first insulating layer or cover layer 305 is secured or laminated on the insulating substrate 301 to cover the cavity 302 and the magnetic core 304. Preferably, the cover layer 305 is formed of the same material as the insulating substrate 301 as this aids bonding between the top surface of the insulating substrate 301 and the lower surface of the cover layer 305. The cover layer 305 may therefore also be formed of a material such as FR4, laminated onto the insulating substrate 301. Lamination may be via adhesive or via heat activated bonding between layers of pre-preg material. In other preferred embodiments of the present invention, other materials may be used for the layer 305.

Figure 1D:
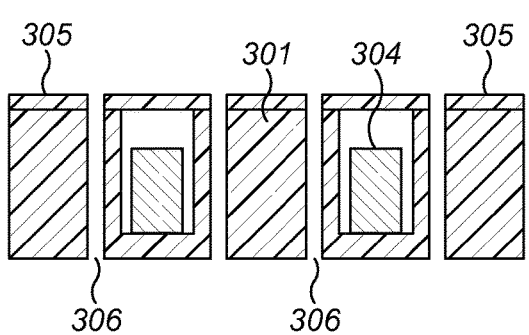
Figure 1D:
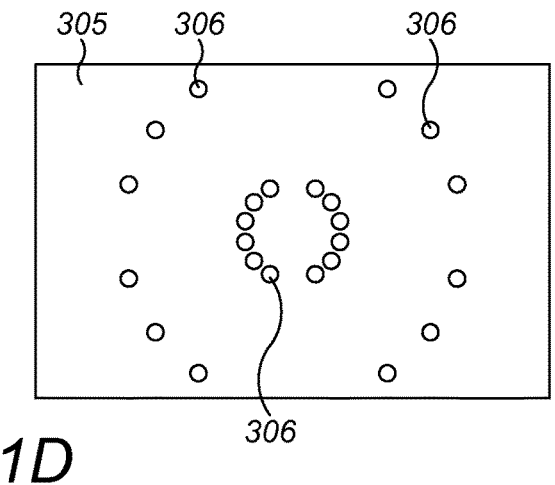

In the next step illustrated in FIG. 1D, though-holes 306 are formed through the insulating substrate 301 and the cover layer 305. The through holes 306 are formed at suitable locations to define the first and second coil conductor windings of an embedded transformer. The exact arrangement of the through-holes 306 will be described later, but a general pattern of through-holes including two arcs corresponding to the inner and outer circular circumferences of the cavity 302 is shown in FIG. 1D. As is known in the art, the through-holes 306 may be formed by drilling, or any other suitable technique.

Figure 1E:
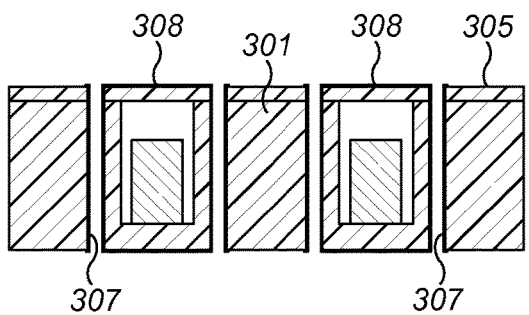
Figure 1E:
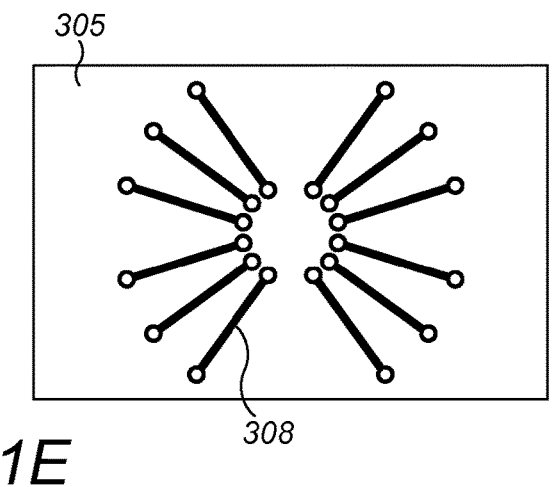

As shown in FIG. 1E, the though-holes 306 are then plated to form conductive via holes 307 that extend from the top surface of the cover layer 305 to the bottom surface of the substrate 301. Conductive or metallic traces 308 are added to the top surface of the cover layer 305 to define an upper winding layer connecting the respective conductive via holes 307, and to form a portion of the windings of the transformer. The upper winding layer is illustrated by way of example in the right hand side of FIG. 1E. The metallic traces 308 and the plating for the conductive via holes 307 are usually formed from copper, and may be formed in any suitable way, such as by adding a copper conductor layer to the outer surfaces of the layer 305 which is then etched to form the necessary patterns, deposition of the copper onto the surface, and so on.

Metallic traces 308 are also formed on the bottom surface of the insulating substrate 301 to define a lower winding layer also connecting the respective conductive via holes 307 to a portion the windings of the transformer. The upper and lower winding layers 308 and the via holes 307 together define the windings of the transformer. In this illustration, only first and second side windings are illustrated.

Figure 1F:
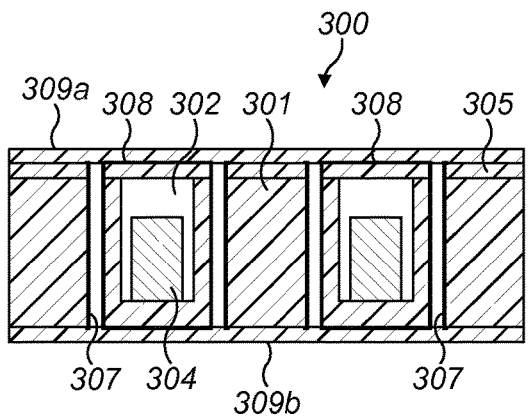
Figure 1F:
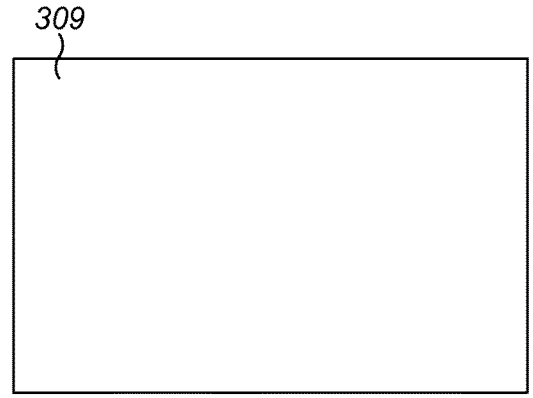
Figure 1G:
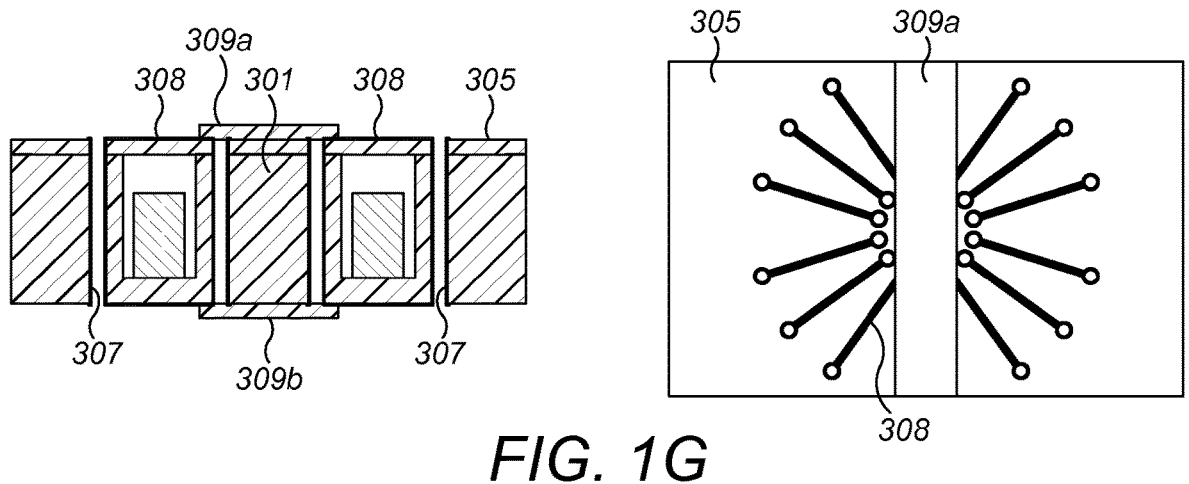

As shown in FIGS. 1F and 1G, optional second and third insulating layers 309 may be formed on the top and bottom surfaces of the structure shown in FIG. 1E to define first and second isolation barriers. The layers may be secured in place by lamination or any other suitable technique.

In FIG. 1F, the bottom surface of the second insulating layer or first isolation barrier 309a adheres to the top surface of the cover layer 305 and covers the terminal lines 308 of the upper winding layer. The top surface of the third insulating layer or second isolation barrier 309b on the other hand adheres to the bottom surface of the substrate 301 and so covers the terminal lines 308 of the lower winding layer. Advantageously, the second and third insulating layers, i.e., first isolation barrier 309a and second isolation barrier 309b, may also be formed of FR4, and so laminated onto the insulating substrate 301 and cover layer 305 using the same process as for the cover layer 305.

Through-holes and via conductors are formed through the second and third insulating layers, i.e., first isolation barrier 309a and second isolation barrier 309b, in order to connect to the input and output terminals of the first and second transformer windings (not shown). Where the conductive via holes 327 through the second and third insulating layers, i.e., first isolation barrier 309a and second isolation barrier 309b, are located apart from the conductive via holes 307 through the substrate 301 and the cover layer 305, a metallic trace is preferably provided on the upper winding layer connecting the input and output vias to the first and last via in each of the first and second windings. Where the input and output vias are formed in overlapping positions, then conductive or metallic caps could be added to the first and last via in each of the first and second windings.

In FIG. 1F, the first and second isolation barriers 309a and 309b define a solid bonded joint with the adjacent layers, either cover layer 305 or substrate 301, on which the upper or lower winding layers 308 of the transformer are formed. The first and second isolation barriers 309a and 309b therefore provide a solid insulated boundary along the surfaces of the embedded magnetic component device, greatly reducing the chance of arcing or breakdown, and allowing the isolation spacing between the first and second side windings to be greatly reduced.

The first and second isolation barriers 309a and 309b are formed on the substrate 301 and cover layer 305 without any air gap between the layers. If there is an air gap in the device, such as above or below the winding layers, then there would be a risk of arcing and failure of the device. The first and second isolation barriers 309a and 309b, the cover layer 305 and the substrate 301, therefore define a solid block of insulating material.

In FIG. 1F, the first and second isolation barriers 309a and 309b are illustrated as covering the whole of the cover layer 305 and the bottom surface of the substrate 301 of the embedded magnetic component device 300. In the alternative preferred embodiment of FIG. 1G, however, it is sufficient if the first and second isolation barriers 309a and 309b are applied to the cover layer 305 and the bottom of the substrate 301 so that they at least cover only the portion of the surface of the cover layer 305 and substrate 301 surface between the first and second windings, where the first and second windings are closest. As shown, the first and second isolation barriers 309a and 309b may then be provided as a long strip of insulating material placed on the surface parallel or substantially parallel to the shorter edge of the device and covering at least the isolation region between the first and second side windings. In alternative preferred embodiments, as the first and second side windings follow the arc of the magnetic core 304 around which they are wound, it may be sufficient to place the isolation barriers 309a and 309b only where the first and second side windings are closest, which in this case is at the 12 o'clock and 6 o'clock positions. As noted above, however, a full layer of the first and second isolation barriers 309a and 309b covering the entire surface of the embedded component device can be advantageous as it provides locations for further mounting of components on the surface of the device.

A first preferred embodiment of an embedded magnetic component transformer device will now be described with reference to FIG. 2. Such an embedded transformer device may be constructed according to the steps described in relation to FIGS. 1A to 1F.

Figure 2:
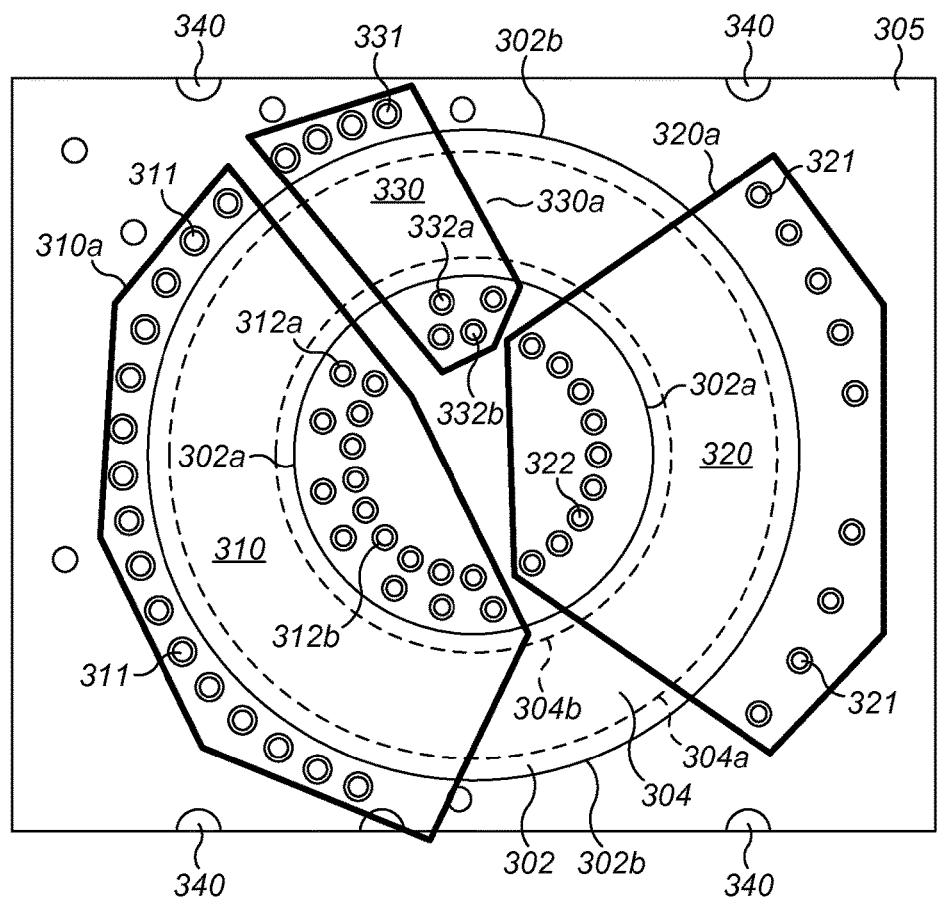
FIG. 2 illustrates a first preferred embodiment of the present invention in a top down view of the conductive vias forming a winding construction.

As shown in FIG. 2, the embedded magnetic component transformer device includes a first winding in region 310 of the substrate, a second winding in the region 320 of the substrate, and an auxiliary winding in the region 330 of the substrate. These windings are located around a common magnetic transformer core 304 with an outer periphery 304a and an inner periphery 304b provided in the cavity 302. For the purposes of illustration the regions labelled 310, 320, 330 are respectively bounded by outlines 310a, 320a, 330a. As shown in FIG. 2, the regions 310, 320 and 330 are separate from one another and occupy discrete areas of the substrate. The windings do not therefore overlap with one another. The central island formed by the cavity 302 may be called the isolation region as it is designed to provide some isolation between the first and second sides of the transformer.

Figure 3:
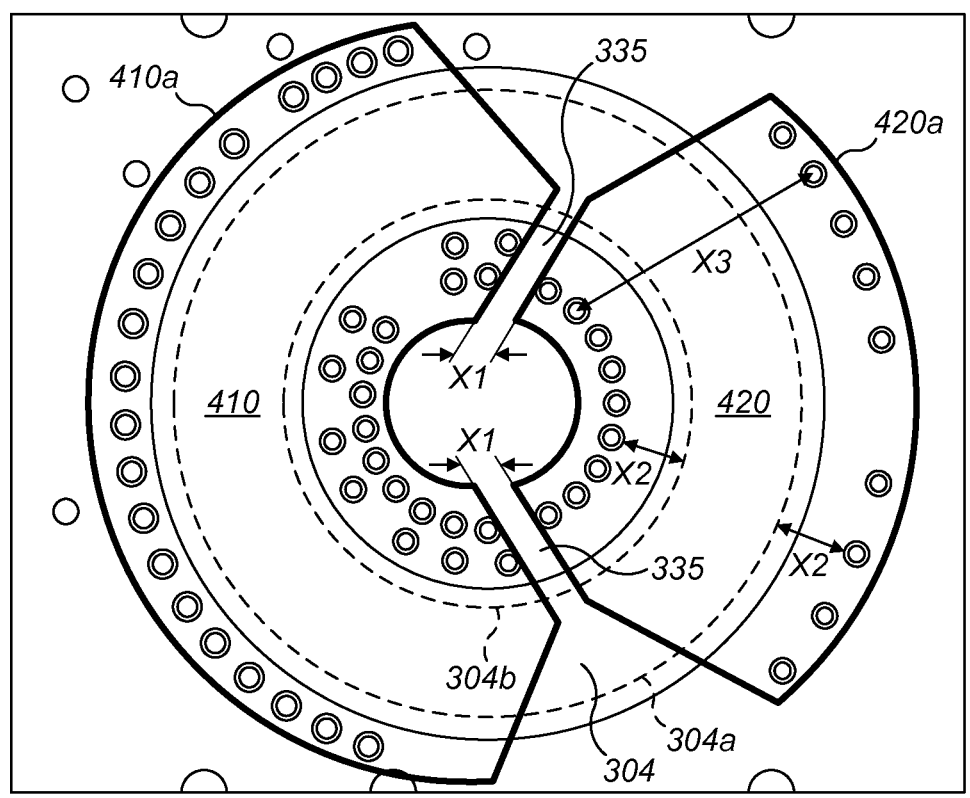
FIG. 3 illustrates the arrangement of the conductive vias in FIG. 2 and the inter-via and winding distances.
Figure 4:
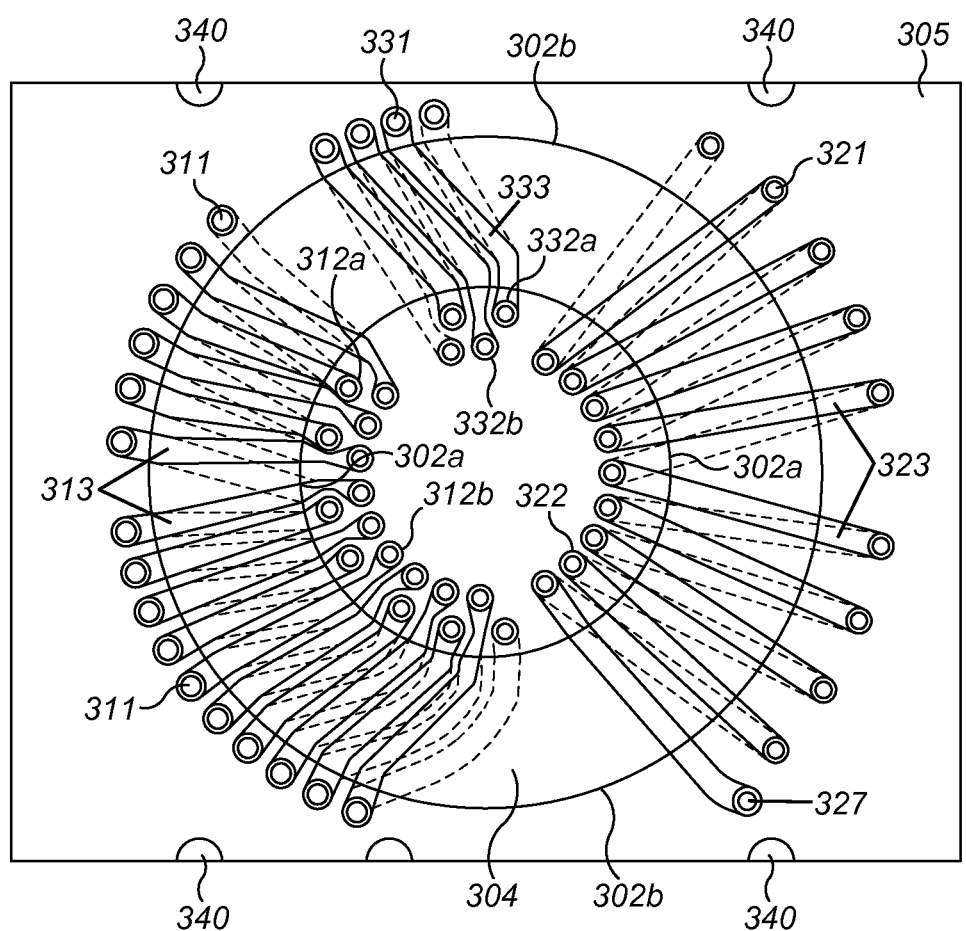
FIG. 4 illustrates the trace pattern for the arrangement of conductive vias in FIGS. 2 and 3.

The first, second, and auxiliary windings of the transformer are defined by upper and lower conductive traces formed on the top and bottom of the resin substrate (not visible in FIG. 2), connected by a plurality of respective conductive connectors extending through the substrate from one side to the other. The conductive connectors may be defined by plated via holes as described above, or maybe conductive pins or filaments. In FIGS. 2, 3, and 4 the conductive connectors are illustrated as plated vias.

The arrangement of the via holes defining the first, second, and auxiliary windings is important because the spacing between the via holes themselves, together with the spacing between the via holes and the magnetic core, affects both the electrical isolation obtainable between the transformer windings, and the degree of coupling between the transformer windings.

In practice, the size of the embedded magnetic component transformer device limits the extent of the spacing available between the via holes. Nevertheless, it is often desirable to maximize the spacing between the vias because this leads to better isolation performance. Large spacings also tend to increase the leakage inductance of the transformer, thereby weakly coupling the windings together. This is often desirable for reasons explained in below. The via hole spacing therefore provides improvements in the isolation characteristics and leakage inductance of the windings, while still allowing a compact transformer device to be realized.

The structure of the separate windings will now be described in more detail.

The first winding of the transformer, located within region 310, includes first outer conductive vias 311, first inner conductive vias 312a and 312b, and upper and lower conductive traces linking the conductive vias (not shown in FIG. 2). The first outer conductive vias 311 are arranged in one row along the circular portion of the outer edge 302b of the cavity 302, and are split into two groups. The first inner conductive vias on the other hand are arranged in two rows: an outer row 312a which is closest to the inner edge 302a of the cavity 302, and an inner row 312b which is adjacent to the outer row 312a but farther from the inner edge 302a of the cavity and closer to the center of the isolation region 335.

The first transformer winding may have the same number of inner and outer conductive vias defining the complete first winding. This ensures that the terminals at either end of the first winding are on the same side, for example on top of the cover layer 305 or on the bottom of the insulating layer. Alternatively, it is also possible to form the first winding with an arrangement where there is one more inner conductive via than there are outer conductive vias, or where there is one fewer inner conductive vias than there are outer conductive vias. Such an arrangement means that the terminals at either end of the first winding are on opposing sides, with one on top of the cover 305 and one on the bottom of the insulating layer. Both of these alternatives, where the terminals are on the same or opposing sides, may be desirable depending on the location of the input and output circuitry to which the terminals are to be connected. The second and auxiliary windings may also be similarly arranged.

As shown in FIG. 2, the outer row 312a of the first inner conductive vias contains seven conductive vias spaced apart, whereas the inner row 312b of the first inner conductive vias contains nine conductive vias, also spaced apart but with less inter-via spacing than for the outer row 312a. Other configurations are possible, although this will alter the leakage inductance of the embedded transformer as described below. The first outer conductive vias 311 are only arranged in one row, with six conductive vias in a first group, and with ten conductive vias in a second group. Other configurations, with a different distribution of the conductive vias between the groups, are also possible. As there are sixteen first inner conductive vias and sixteen first outer conductive vias, the first winding includes sixteen complete turns when the conductive vias are connected by the conducting traces.

The second winding of the transformer includes second outer conductive vias 321, second inner conductive vias 322, and conductive traces linking the conductive vias (not shown in FIG. 2). The second outer conductive vias 321 are arranged in a single row along the circular portion of the outer edge 302b of the cavity 302, and as with the conductive vias of the first winding they are split into two groups. The second inner conductive vias are also arranged in a single row 322.

The curved row of second inner conductive vias 322 is provided such that the conductive vias are at a constant or substantially constant distance from the inner edge 302a of the cavity 302. The distance between the row of second inner conductive vias 322 and the inner edge 302a of the cavity 302 is larger than that between the outer row of first inner conductive vias 312a and the inner edge 302a of the cavity 302. Preferably, the distance between the row of second inner conductive vias 322 and the inner edge 302a of the cavity 302 is large enough to accommodate another row of conductive vias between the row 322 and the inner edge 302a of the cavity 302.

The curved rows of second outer conductive vias 321 are also provided such that the conductive vias are at a constant or substantially constant distance from the outer edge 302b of the cavity 302. The distance between the rows of second outer conductive vias 321 and the outer edge 302b of the cavity 302 is larger than that between the row of first outer conductive vias 311 and the outer edge 302b of the cavity 302. Preferably, the distance between the rows of second outer conductive vias 321 and the outer edge 302b of the cavity 302 is large enough to accommodate another row of conductive vias between the rows 321 and the outer edge 302b of the cavity.

In the preferred embodiment shown in FIG. 2, the second inner conductive vias 322 include nine conductive vias, and the second outer conductive vias 321 include nine conductive vias, split into one group of four conductive vias and one group of five conductive vias. Therefore the second winding includes nine turns when the conductive vias are connected by the conducting traces. Other configurations are equally possible.

The auxiliary winding of the transformer includes auxiliary outer conductive vias 331, auxiliary inner conductive vias 332a and 332b, and conductive traces linking the conductive vias (not shown in FIG. 2). The auxiliary outer conductive vias are arranged in one row along the circular portion of the outer edge 302b of the cavity 302. The auxiliary inner conductive vias are arranged in two rows: an outer row 332a which is closest to the inner edge 302a of the cavity 302, and an outer row 332b which is adjacent to the outer row 332a but farther from the inner edge 302a of the cavity 302.

As shown in FIG. 2, each of the outer row 332a and inner row 332b of the auxiliary inner conductive vias contains two vias, although other configurations are possible. The auxiliary outer conductive vias 331 are only provided in one row including five conductive vias. As there are four auxiliary inner conductive vias, the auxiliary winding includes five turns when the conductive vias are connected by the conducting traces.

In some preferred embodiments of the present invention, the voltage across the auxiliary winding is fed back to the input circuitry being used to energize the first winding, the auxiliary winding acting as a feedback winding. Alternatively or additionally, the auxiliary winding can be used to control some other aspect of the input and/or output circuitry. Other uses of the auxiliary winding could be to provide a housekeeping supply or to control a synchronous rectifier. More than one auxiliary winding could be provided, allowing more than one of these functions to be carried out. Other uses for the auxiliary windings are also possible.

When the transformer is in operation, the ratio of the voltages provided across the first, second, and auxiliary windings is proportional to the number of turns in each respective winding. Therefore, the number of turns in each winding can be chosen, by adding or removing conductive vias and conductive traces, in order to obtain desirable voltage ratios between the windings. This is particularly important in, for example, isolated DC to DC converters where strict requirements as to the output voltage will typically need to be met.

Optional terminations 340 provided in the substrate of the embedded transformer device are also shown. These may take the form of edge castellations providing for Surface Mount Application (SMA) connections from the embedded transformer device to a printed circuit board on which the embedded transformer device may be mounted. The cover layer 305 is arranged so as not to cover these terminations, to allow them to be connected to the other electrical components.

As explained above, the spacing between adjacent conductive vias and the spacing between the via holes and the magnetic core has implications for the electrical isolation between the transformer windings and the amount of leakage inductance present in the transformer device. At the same time, it is desirable to provide a transformer device with a small footprint, thereby limiting the extent to which these spacings can be increased.

FIG. 3 shows the spacings between the windings and vias in more detail. FIG. 3 shows the identical arrangement of conductive vias shown in FIG. 2. Some components have not however been labelled in FIG. 3 for the sake of clarity. It should nevertheless be understood that all of the components that were labelled and described in relation to FIG. 2 also apply to the subsequent figures. For simplicity, the first and auxiliary windings will be jointly referred to as input side windings, which occupy a region 410 bounded by the line 410a. The second windings will by referred to as output side windings, which occupy a region 420 bounded by the line 420a.

Three different spacings have been taken into consideration in the design shown in FIGS. 2 and 3. Distance X1 illustrated in FIG. 3 is the isolation distance or minimum distance between the input side windings and the output side windings. As can be seen in FIG. 3, the gap in the isolation region 335 separating the input side inner conductive vias from the output side inner conductive vias is the minimum gap between the input side and output side windings. It is smaller than the gap outside the cavity 302 separating the input side outer conductive vias from the output side outer conductive vias. Further, the upper and lower conductive traces of the input side windings and the conductive trace of the output side windings that are closest to one another diverge from each other as they extend outwards from the center of the cavity 302 to the outer side of the substrate in a direction from the center of the embedded transformer to its outer edge. This means that distance X1 in the isolation region 335 is the closest distance between conductive vias of the input side windings and conductive vias of the output side windings.

The distance X2 is the minimum distance between the outer 321 and inner 322 conductive vias that define the output side (second) windings and the magnetic core 304. The distance between the upper and lower conductive traces and the magnetic core 304 is not considered here as the upper and lower conductive traces are provided above the cover layer 305, or below a layer of the insulating substrate provided below the cavity 302, with the result that the traces are better isolated from the magnetic core 304 than the conductive vias 321 and 322. In the arrangement of FIG. 3, this minimum distance occurs at the two locations labelled X2. As can be understood from FIG. 3, the distance X2 is significantly greater than the corresponding distance between the inner and outer conductive vias 311, 312, 331, and 332 on the input side windings and the magnetic core 304.

Finally, the distance X3 is the distance between the second outer conductive vias 321 and the second inner conductive vias 322. This distance is constant or substantially constant for all of the opposing second conductive vias (that is, all pairs of second inner and second outer conductive vias) that will be joined by a upper and lower conductive trace. In practice, small variations or tolerances in the distance are possible.

The significance of the distances X1, X2, and X3 will now be described with regard to insuring that the input side windings and output side windings are sufficiently isolated electrically from one another. Electrical isolation is necessary to prevent a breakdown in the gap between the windings occurring and the transformer windings from being subsequently shorted. The level of isolation between the input side and output side windings, that is the maximum voltage difference that the transformer can withstand between the input side and output side windings without electrical arcing, is determined by both the direct path between the input side and output side windings themselves and, because the magnetic core 304 is an electrical conductor, by an indirect path between the windings extending through the magnetic core 304.

The direct path between the input side and output side windings can be maximized by making the distance X1 as large as possible. The isolation is determined by the minimum distance X1 at the two locations shown in FIG. 3. This may be between the first winding and the second winding, or the auxiliary winding and the second winding. However, there is a practical limitation on the extent to which this distance can be increased because of the size of that portion of the insulating substrate enclosed within the magnetic core 304, the isolation region 335, which defines a limited space in which all of the inner conductive vias must be necessarily formed. It is undesirable for the central isolation region 335 and the transformer to be too large because space on the circuit board, to which the transformer will be connected, is at a premium. Therefore, as shown in FIGS. 2 and 3, a way of increasing the distance X1 while still keeping the same number of inner conductive vias is to provide those inner conductive vias on the input side windings in more than one row, for example, two rows 312a, 312b for the first winding, and two rows 332a, 332b for the auxiliary winding. This allows a larger separation between input side and output side inner conductive vias than would be achievable if a single row were used, as vias that would otherwise appear in the gap between the input side and output side windings can be accommodated in the second row of vias. Using multiple rows therefore enables the overall size of the transformer to be reduced compared to using only a single row, while still maintaining the required isolation characteristics.

The indirect path between the input side and output side windings, that is on a path extending through the magnetic core 304, can be maximized by making the distance between the conductive vias of the input side windings and the core 304, or between the conductive vias of the output side windings and the core 304, as large as possible. As the degree of isolation will be set by the greater of these two distances, it is necessary only to consider one of them when setting the size of the indirect isolation path.

In the preferred embodiment of FIGS. 2 and 3, the two-row staggered arrangement of inner conductive vias provided on the input side requires that some of the conductive vias are positioned closely to the magnetic core 304. This is necessary because there are more conductive vias on the input side than the output side, and is also necessary to maintain the distance X1 as described above. In contrast, the inner conductive vias on the output side are provided in only a single row, which enables them to be positioned further from the magnetic core increasing the distance X2. The outer conductive vias on the output side are also provided in a single row, again enabling them to be positioned further from the magnetic core. As shown in FIG. 3, the single row of inner conductive vias on the output side is separated or set back from the inner periphery of the cavity 302 by a distance sufficient to accommodate another row of vias. In other words, the row of vias closest to the cavity 302 on the input side is not continued around the inner periphery of the cavity 302 on the output side but is instead omitted to provide a further isolation gap.

In some preferred embodiments of the present invention, the inner conductive connectors of the first winding 312a on the curved row closest to the inner periphery 302a of the cavity 302 are arranged on a first circular or substantially circular arc having a first radius, and the inner conductive connectors of the second winding 322 are arranged on a second circular or substantially circular arc. The first and second circular arcs are concentric or substantially concentric, that is they share the same center. The radius of the first circular arc is greater than that of the second circular arc.

In some preferred embodiments of the present invention, the distance between the inner periphery 302a of the cavity 302 and the second inner conductive vias 322 is greater than or equal to the diameter of the first inner conductive vias 312a provided on the row closest to the inner periphery 302a of the cavity 302. This distance may also be greater than or equal to the diameter of the auxiliary inner conductive vias 332a provided on the row closest to the inner periphery 302a of the cavity 302.

In these preferred embodiments of the present invention, the indirect path is therefore maximized by making the distance X2, between the output side windings and the magnetic core 304, as large as possible. Overall, the electrical isolation is therefore determined by the minimum value of X1 and X2. This means that, for a certain minimum electrical isolation to be realized, both the distances X1 and X2 must be larger than a predetermined value.

The spacing and positions of the conductive vias not only affects the electrical isolation but also alters the coupling characteristics, for example the amount of leakage inductance, between the different windings. This is because the leakage inductance results from imperfect magnetic flux linking through the windings due to the magnetic flux not being entirely constrained within the magnetic core. Some leakage inductance is desirable because it has the effect of providing an inductance in series with the transformer windings, which combined with the distributed capacitance that exists between adjacent transformer turns enables the transformer to act as an oscillating LC circuit, as will be explained in more detail below in relation to FIGS. 5 and 6.

The leakage inductance can be increased by: (i) increasing the gap between the windings; and (ii) increasing the distance between pairs of connected conducting vias. Staggering the conductive vias by providing them on more than one row allows room for an increase in the gap between the windings, thereby contributing to (i), and also increases the gap between some of the inner and outer connected conductive vias, thereby contributing to (ii).

Increasing the gap between the first and second windings increases the amount of magnetic flux that does not couple through the windings, thereby increasing the leakage inductance. The leakage inductance can also be increased by increasing the gap between the first and auxiliary windings, or between the second and auxiliary windings. A combination of any or all of these can be used. For example, the distance X1 shown in FIG. 3 can be increased to further the separation between the first and second windings, and between the auxiliary and second windings.

Increasing the distance between pairs of conducting vias that are, in the complete embedded transformer, connected by conducting traces leads to more space between the magnetic core 304 and the windings, with the result that the magnetic flux can more easily escape. This distance is shown as X3 in FIG. 3, in relation to the second winding.

Thus, the particular configuration of conductive vias described above balances the requirements for isolation and leakage inductance, while allowing the resulting embedded magnetic component transformer device to occupy only a small footprint.

Although not shown in the figures, the leakage inductance can also be increased by increasing the equivalent distances in relation to the first and/or auxiliary windings.

Staggering the conductive vias by providing them on more than one row, as is shown in FIG. 3 for the inner conductive vias of the input side windings, further increases the leakage inductance compared to the case where all of the conductive vias are provided in a single row. This is because such an arrangement allows more space between the conductive vias defining the outer row, making it easier for the magnetic flux to escape.

FIG. 4 shows complete first, second, and auxiliary windings formed by linking the conductive vias together by conductive traces 313, 323, and 333. The conductive traces 313, 323, and 333 shown with a solid outline are the upper conductive traces and are provided on the first side of the insulating substrate 301, whereas the conductive traces 313, 323, and 333 shown with a dashed outline are the lower conductive traces and are provided on the second side of the insulating substrate 301. The first winding therefore includes first outer conductive vias 311 linked by the conductive traces 313 to the first inner conductive vias 312a (for the outer row) and 312b (for the inner row). In the arrangement of FIG. 4, the turns making up the first winding alternatively pass through first inner conductive vias 312a and 312b as they loop around the core. Similarly, the second winding includes second outer conductive vias 321 linked by the conductive traces 323 to the second inner conductive vias 322, and the auxiliary winding includes auxiliary outer conductive vias 331 linked by the conductive traces 333a (for the outer row) and 333b (for the outer row).

In FIG. 4 connections to the first, second, and auxiliary windings respectively may be made by traces on the top and bottom of the substrate (not shown) connecting to the respective vias. Further conductive vias can be provided through the insulating substrate to link these conductive regions from one side of the insulating substrate to the other. Note that to improve the clarity of FIG. 4, the magnetic core 304 is not shown and not all of the conductive vias are labelled.

In alternative preferred embodiments of the present invention, the shape of the insulating substrate may vary. However, the shape of the insulating material does not significantly affect the performance of the transformer, which is determined by the position and number of conductive vias in each of the transformer windings.

In further preferred embodiments of the present invention, the auxiliary windings may be included within the output side windings rather than the input side windings as described above. The isolation and leakage inductance requirements of the previous preferred embodiments may then apply between (i) the first winding, and (ii) the second and auxiliary windings.

The embedded magnetic component device described above with reference to FIGS. 2 to 4 has particular application to Royer circuit configurations (also known as self-oscillating push-pull circuits). The embedded magnetic component device allows the Royer circuit to have a high level of electrical isolation together with short circuit protection. Such an arrangement is illustrated schematically by the circuit diagram of FIG. 5.

The circuit takes a DC input between input terminals +V and GND, with the GND terminal being held a ground potential. A resistor R1 and capacitor C1 are connected in series across the input terminals, and a node 605 is located between them. The transformer TX1 is defined by an embedded transformer of the previously described preferred embodiments, and includes a first winding defined between nodes 610 and 614, a second winding defined between nodes 620 and 624, and an auxiliary winding defined between nodes 630 and 634. Node 612 is connected partially along the first winding, node 622 is connected partially along the second winding, and node 632 is connected partially along the auxiliary winding. In one example, the nodes connected partially along the windings are connected to the midpoint of the respective windings. Thus, the first winding is divided into two windings 611 and 613, the second winding is divided into two windings 621 and 623, and the auxiliary winding is divided into two windings 631 and 633.

Two transistors TR1 and TR2 are provided to switch in and out an energizing voltage across the two portions of the first windings 613 and 611 respectively. The transistors shown are npn-type but other types are possible. High power switching transistors, for example, MOSFETs (metal oxide semiconductor field effect transistors) are suitable. The collector of transistor TR1 is connected to a first end of the first winding at node 610, and the collector of transistor TR2 is connected to a second end of the first winding at node 614. The emitter of transistor TR1 is connected to one terminal of inductor L2, and the other terminal of inductor L2 is connected to node 602. The emitter of transistor TR2 is connected to one terminal of inductor L1, and the other terminal of inductor L1 is connected to node 602. Node 602 is connected to node 603, which is held at ground potential. A first terminal of capacitor C2 is connected to node 603, and the other terminal is connected to node 604 which is connected directly to the high voltage input +V. Between node 604 and node 612 a resistor R3 is provided.

Figure 5:
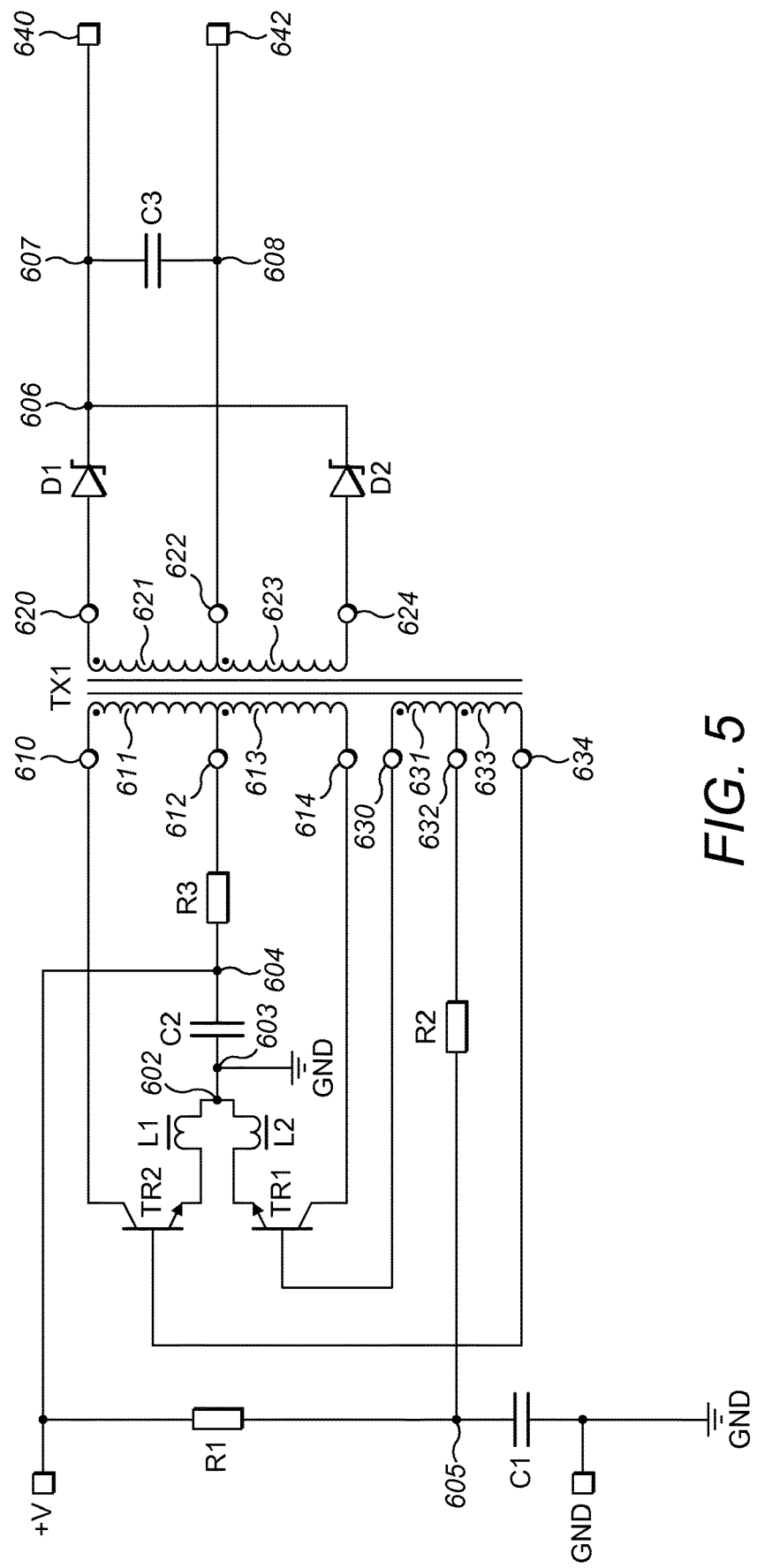
FIG. 5 illustrates a preferred embodiment of the present invention where the embedded transformer device defines a portion of a self-oscillating push-pull circuit.

It may be desirable to add a further inductance or capacitance to the embedded transformer by way of the circuit components in FIG. 5. To increase the leakage inductance of the transformer, for example, an inductance may also be provided in series with the resistor R3, or at nodes 610, 612, 614. A ferrite bead may be used as the additional inductor, in place of, or in addition to, the resistor R3. Additionally, a capacitor may be added to the circuit connected to nodes 610, 612 or 614. By adding inductance or capacitance to the input side, the LC properties of the transformer, and the oscillating circuit formed by the transformer and the circuitry of FIG. 5, can be fine-tuned.

Each end of the auxiliary coil is connected to one of the bases of the transistors. Thus, node 630 is connected to the base of transistor TR1, and node 634 is connected to the base of transistor TR2. Node 632 is connected to the first terminal of resistor R2, the second terminal of resistor R2 being connected to node 605.

The circuit oscillates between energizing the winding 611 and energizing the winding 613. When winding 613 is energized, the increasing magnetic flux passing through the core of transformer TX1 induces a voltage across the auxiliary windings 631 and 633. The induced voltage across auxiliary winding 631 is of the correct polarity to apply a voltage to the base terminal of transistor TR1 in order to keep transistor TR1 switched on. A positive feedback arrangement is thereby achieved, with TR1 being switched on and TR2 being switched off. Eventually the magnetic field within the core saturates and the rate of change of magnetic flux within it drops to zero. The voltage across the first winding 613, and therefore the current flowing through it, also drops to zero. The auxiliary windings 631 and 633 react to this change and an induced voltage, of reverse polarity, is set up across them. This has the effect of switching on transistor TR2 and switching off transistor TR1, thereby energizing the winding 611. Again, positive feedback is set up such that the voltage applied to the base of transistor TR2 by the auxiliary winding 633 maintains transistor TR2 in a switched on state, while keeping transistor TR1 in a switched off state. Following this, the magnetic field within the core saturates and the circuit returns to energizing the winding 613. This oscillatory behavior, alternating between energizing the first windings 611 and 613, continues indefinitely as long as input power is provided.

On the output side of the transformer TX1, a diode D1 has one terminal connected to node 620 and the other connected to node 606, and is biased in a direction towards the node 606. A diode D2 is also provided, having one terminal connected to node 624 and the other connected to node 606, and again is biased in a direction towards the node 606. Node 622 is directly connected to node 608, and node 606 is directly connected to node 607. A capacitor C3 is provided between the nodes 607 and 608. Node 607 is connected to first output terminal 640, and node 608 is connected to second output terminal 642.

The second windings 621 and 623 have voltages induced across them according to the rate of change of magnetic flux within the transformer core. Thus, an alternating current is set up through the combined windings 621 and 623. When this current circulates in a first direction, diode D1 is forward biased and current flows into node 622, through winding 621, and out of node 620, and a voltage is set up across the output terminals 640 and 642. Diode D2 is reverse biased so no current is able to flow through winding 623. When the alternating current circulates in a second direction, diode D2 is forward biased and current flows into node 622, through winding 623, and out of node 624, thereby again applying a voltage of the same polarity across the output terminals 640 and 642. The diodes D1 and D2 thereby rectify the alternating current, and the capacitor C3 smooths the output to provide an approximately constant direct current between the output terminals 640 and 642. The circuit illustrated in FIG. 5 is therefore an isolated DC to DC converter, taking a DC input across terminals +V and GND, and generating a DC output across terminals 640 and 642. The voltage of the DC output relative to that of the DC input can be adjusted by varying the number of turns on the first 611, 613 and second 621, 623 windings.

Although in the preferred embodiment of FIG. 5 the embedded transformer device is included in a Royer circuit, it should be noted that its advantages may be realized in any power converter circuit topology containing an embedded transformer.

As the embedded transformer device according to various preferred embodiments of the present invention has a large leakage inductance, the embedded transformer and driving circuit, for example, the Royer circuit of FIG. 5, can activate a short circuit mode when necessary. This will be described in more detail below and with reference to FIG. 6.

When the transformer is shorted out, meaning that a short circuit occurs corresponding to a breakdown in the isolation between input side and output side windings, the inductance of the first winding drops to approximately zero. Therefore, the leakage inductance $L_{leakage}$ and the distributed capacitance set up between the transformer windings $C_{distributed}$ form an oscillating LC circuit with resonant frequency:

$$\omega_0 = (L_{leakage} C_{distributed})^{-1/2}.$$

By adjusting the leakage inductance one can tune the resonant frequency of such a circuit. It is also possible to tune the resonant frequency by adjusting the distributed capacitance. However, this requires rearranging the vias and adjusting the spacing between them, which may not be possible due to space constraints on the substrate or PCB of the transformer.

Figure 6:
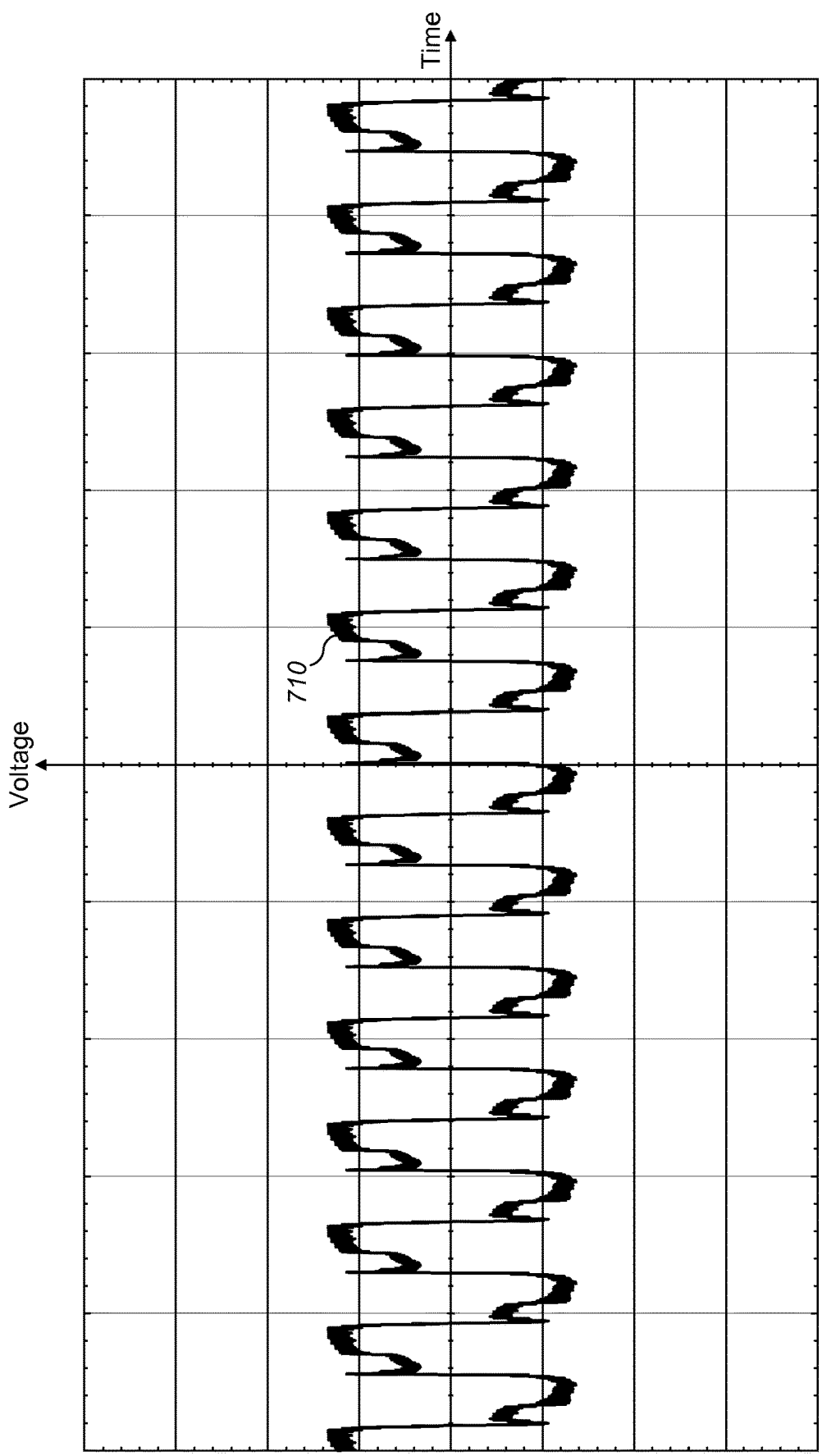
FIG. 6 is a graph showing high-frequency oscillations of the transformer voltage during a short circuit mode.

FIG. 6 shows a plot 710 of the voltage across a measurement coil including two turns wound upon the magnetic core 304. This voltage is plotted on the y-axis against time on the x-axis. The y-axis graduations show volts and x-axis graduations show nanoseconds. The high-frequency oscillations are clearly visible.

The high-frequency oscillation mode that the transformer enters when a short circuit occurs serves to limit the amount of power transferred between the windings, for example between the first winding and the second winding, with the result that the usual high currents that accompany a short circuit are not present. As these high currents damage the electrical components through which they pass, for example switching transistors connected to the embedded transformer, damage to the electrical components is avoided by use of this mode. The high-frequency oscillation mode has the advantage that it is inherent to the transformer itself, rather than originating from any other external circuitry designed to switch out high currents that are present when a short circuit occurs. It therefore ensures that the embedded transformer and associated components are always protected against short circuits, and avoids the possibility that any external circuitry may fail thereby preventing adequate short circuit protection.

Furthermore, the transformer can withstand being in a short circuit condition continuously, for an extended period of time, simply by maintaining the high-frequency mode of oscillation and thereby avoiding damage to the electrical components until such a time as the short circuit is no longer present and the electrical components will not be damaged. The transformer then returns to its normal operation.

Although reference is made to conductive vias throughout the present application, it should be noted that any conductive connector, for example, conductive pins, can equally well be used in place of any one or more of the conductive vias. Furthermore, the first and second windings can each either be primary transformer windings being connected to the input power supply of the transformer, or secondary transformer windings being connected to the output of the transformer. The embedded transformer device can be either a step-up or step-down transformer.

Further, although, in the examples above, the magnetic core 304 and cavity 302 are illustrated as being circular or substantially circular in shape, it may have a different shape in other preferred embodiments of the present invention. Non-limiting examples include, an oval or elongated toroidal shape, a toroidal shape having a gap, EE, EI, I, EFD, EP, UI and UR core shapes. The magnetic core 304 may be coated with an insulating material to reduce the possibility of breakdown occurring between the conductive magnetic core and the conductive vias or metallic traces. The magnetic core may also have chamfered edges providing a profile or cross section that is rounded.

In the description above, a converter has been described with 16 turns on the primary side windings, and nine turns on the secondary side as a non-limiting example. In other preferred embodiments of the present invention, different numbers of turns on the primary and secondary side may be used. Known Royer circuits, for example, may include 16 turns for the primary side and 18 turns for the secondary side. The transformer illustrated in FIG. 4 therefore reduces the number of turns required for the secondary side by substituting the known Royer circuit output for a synchronized rectifier circuit. In alternative preferred embodiments, the transformer in FIG. 4 may be adapted so that the primary side turns are reduced, using a half bridge circuit on the input side and a normal Royer output on the secondary side. This would reduce the number of turns needed for the transformer by 6 on the primary side compared with the known Royer circuit device. Alternatively, both of the primary and secondary windings could have reduced turns, by using a half bridge circuit on the primary side, and a synchronized rectifier circuit on the output. This would reduce the number of turns required from the known Royer circuit configuration by 13. In all cases, reducing the number of turns means more flexibility in the design layout and higher potential isolation between the components. However, reducing secondary turns requires only one additional transistor (e.g. in a FET dual package) to be added to the circuit. Reducing the primary side windings requires a half bridge circuit to be provided meaning more components on the input side compared with the known Royer design.

Various modifications to the preferred embodiments described above are possible and will occur to those skilled in the art without departing from the scope of the invention which is defined by the following claims.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

The invention claimed is:

1. An embedded transformer device, comprising:
   an insulating substrate including a first side and a second side opposite the first side, and including a cavity therein, the cavity including an inner and an outer periphery;
   a magnetic core housed in the cavity including a first section and a second section;
   a first winding extending through the insulating substrate and around the first section of the magnetic core; and
   a second winding extending through the insulating substrate and around the second section of the magnetic core; wherein
   the first winding and the second winding are located in separate regions from each other in the insulating substrate such that a first boundary around the first winding does not overlap a second boundary around the second winding;
   each of the first and second windings include:
      upper conductive traces located on the first side of the insulating substrate;
      lower conductive traces located on the second side of the insulating substrate;
      inner conductive connectors extending through the insulating substrate adjacent to an inner periphery of the magnetic core, the inner conductive connectors respectively defining electrical connections between respective upper conductive traces and respective lower conductive traces; and
      outer conductive connectors extending through the insulating substrate adjacent to an outer periphery of the magnetic core, the outer conductive connectors respectively defining electrical connections between respective upper conductive traces and respective lower conductive traces;
   the inner conductive connectors of the first winding are arranged in a plurality of curved rows, each of the plurality of curved rows being positioned at a constant or substantially constant distance from an inner periphery of the cavity;
   the inner conductive connectors of the second winding are arranged in a first curved row positioned at a constant or substantially constant distance from the inner periphery of the cavity that is large enough to allow a second curved row of inner conductive connectors to be accommodated between the first curved row and the inner periphery of the cavity; and
   the outer conductive connectors of the second winding are arranged in a first curved row positioned at a constant or substantially constant distance from the outer periphery of the cavity that is large enough to allow a second curved row of outer conductive connectors to be accommodated between the first curved row and the outer periphery of the cavity.

2. The embedded transformer device of claim 1, wherein:
   the inner conductive connectors of the first winding on a curved row closest to the inner periphery of the cavity are arranged on a first circular or substantially circular arc having a first radius;
   the inner conductive connectors of the second winding on the first curved row are arranged on a second circular or substantially circular arc, concentric to the first circular or substantially circular arc, having a second radius; and
   the first radius is greater than the second radius.

3. The embedded transformer device of claim 1, wherein the first winding is spaced apart from the second winding so that electrical isolation is provided between the first winding and the second winding.

4. The embedded transformer device of claim 1, wherein the first winding does not overlap with the second winding in a thickness direction of the insulating substrate.

5. The embedded transformer device of claim 1, further comprising:
   a first isolation barrier located on the first side of the insulating substrate, covering at least a portion of the first side between the first winding and the second winding where the first winding and second winding are closest, and defining a solid bonded joint with the first side of the insulating substrate; and
   a second isolation barrier located on the second side of the insulating substrate covering at least a portion of the second side between the first winding and the second winding where the first winding and second winding are closest, and defining a solid bonded joint with the second side of the insulating substrate.

6. The embedded transformer device of claim 1, further comprising:
   an auxiliary winding, extending through the insulating substrate and around the magnetic core, the auxiliary winding including:
      upper conductive traces located on the first side of the insulating substrate;
      lower conductive traces located on the second side of the insulating substrate;
      inner conductive connectors extending through the insulating substrate adjacent to the inner periphery of the magnetic core, the inner conductive connectors respectively defining electrical connections between respective upper conductive traces and respective lower conductive traces; and
      outer conductive connectors extending through the insulating substrate adjacent to the outer periphery of the magnetic core, the outer conductive connectors respectively defining electrical connections between respective upper conductive traces and respective lower conductive traces; wherein
   the inner conductive connectors of the auxiliary winding are arranged in a plurality of curved rows, each of the plurality of curved rows being positioned at a constant or substantially constant distance from the inner periphery of the cavity.

7. The embedded transformer device of claim 6, wherein the auxiliary winding is spaced apart from the second winding so that electrical isolation is provided between the auxiliary winding and the second winding.

8. The embedded transformer device of claim 1, wherein electrical isolation is provided by a minimum of:
   a minimum distance of separation between the first winding and the second winding; and
   a minimum distance of separation between the second winding and the magnetic core.

9. The embedded transformer device of claim 1, wherein the constant or substantially constant distance being large enough to allow a second curved row of outer conductive connectors to be accommodated increases a leakage inductance of the transformer device.

10. The embedded transformer device of claim 1, wherein a leakage inductance of the transformer device and a distributed capacitance of the first and second windings define a high-frequency oscillating LC circuit, operable to limit power transfer between the first and second windings when a short circuit occurs.

11. A power converter comprising the embedded transformer device of claim 1.

12. The power converter of claim 11, further comprising circuitry to energize the first and second windings, wherein the circuitry is a Royer circuit.

13. An embedded transformer device, comprising:
   an insulating substrate including a first side and a second side opposite the first side, and including a cavity therein, the cavity including an inner and an outer periphery;
   a magnetic core housed in the cavity including a first section and a second section;
   a first winding, extending through the insulating substrate and around the first section of the magnetic core;
   a second winding, extending through the insulating substrate and around the second section of the magnetic core; wherein
   the first winding and the second winding are located in separate regions from each other in the insulating substrate such that a first boundary around the first winding does not overlap a second boundary around the second winding;
   each of the first and second windings includes:
      upper conductive traces located on the first side of the insulating substrate;
      lower conductive traces located on the second side of the insulating substrate;
      inner conductive connectors extending through the insulating substrate adjacent to an inner periphery of the magnetic core, the inner conductive connectors respectively defining electrical connections between respective upper conductive traces and respective lower conductive traces; and
      outer conductive connectors extending through the insulating substrate adjacent to an outer periphery of the magnetic core, the outer conductive connectors respectively defining electrical connections between respective upper conductive traces and respective lower conductive traces;
   the inner conductive connectors of the first winding are arranged in two or more first curved rows, each of the two or more first curved rows being positioned at a constant or substantially constant distance from an inner periphery of the cavity;
   the inner conductive connectors of the second winding are arranged in one or more second curved rows, each of the one or more second curved rows being positioned at a constant or substantially constant distance from the inner periphery of the cavity; and
   a minimum distance between the inner conductive connectors of the second winding and the magnetic core is greater than a minimum distance between the inner conductive connectors of the first winding and the magnetic core.

14. A method of manufacturing an embedded transformer device, comprising:
   a) preparing an insulating substrate including a first side and a second side opposite the first side, and including a cavity therein, the cavity including an inner and an outer periphery;
   b) inserting a magnetic core into the cavity;
   c) forming a first winding, extending through the insulating substrate and around a first section of the magnetic core;
   d) forming a second winding, extending through the insulating substrate and around a second section of the magnetic core; wherein
   the first winding and the second winding are located in separate regions from each other in the insulating substrate such that a first boundary around the first winding does not overlap a second boundary around the second winding;
   each of the first and second windings includes:
      upper conductive traces located on the first side of the insulating substrate;
      lower conductive traces located on the second side of the insulating substrate;
      inner conductive connectors extending through the insulating substrate adjacent to an inner periphery of the magnetic core, the inner conductive connectors respectively forming electrical connections between respective upper conductive traces and respective lower conductive traces; and
      outer conductive connectors extending through the insulating substrate adjacent to the outer periphery of the magnetic core, the outer conductive connectors respectively forming electrical connections between respective upper conductive traces and respective lower conductive traces;
   e) arranging the inner conductive connectors of the first winding in a plurality of curved rows, each of the plurality of curved rows being positioned at a constant or substantially constant distance from an inner periphery of the cavity;
   f) arranging the inner conductive connectors of the second winding in a first curved row positioned at a constant or substantially constant distance from the inner periphery of the cavity that is large enough to allow a second curved row of inner conductive connectors to be accommodated between the first curved row and the inner periphery of the cavity; and
   g) arranging the outer conductive connectors of the second winding in a first curved row positioned at a constant or substantially constant distance from the outer periphery of the cavity that is large enough to allow a second curved row of outer conductive connectors to be accommodated between the first curved row and the outer periphery of the cavity.

15. The method of claim 14, further comprising:
arranging the inner conductive connectors of the first winding on a curved row closest to the inner periphery of the cavity on a first circular or substantially circular arc having a first radius;
arranging the inner conductive connectors of the second winding on the first curved row on a second circular or substantially circular arc, concentric to the first circular or substantially circular arc, having a second radius; wherein
the first radius is greater than the second radius.

16. The method of claim 14, further comprising spacing the first winding apart from the second winding so that electrical isolation is provided between the first winding and the second winding.

17. The method of claim 14, wherein the first winding does not overlap with the second winding in a thickness direction of the insulating substrate.

18. The method of claim 14, further comprising:
providing a first isolation barrier on the first side of the insulating substrate, covering at least a portion of the first side between the first winding and the second winding where the first winding and second winding are closest, and defining a solid bonded joint with the first side of the insulating substrate; and
providing a second isolation barrier on the second side of the insulating substrate covering at least a portion of the second side between the first winding and the second winding where the first winding and second winding are closest, and defining a solid bonded joint with the second side of the insulating substrate.

19. The method of claim 14, further comprising:
forming an auxiliary winding, extending through the insulating substrate and around the magnetic core, the auxiliary winding including:
upper conductive traces located on the first side of the insulating substrate;
lower conductive traces located on the second side of the insulating substrate;
inner conductive connectors extending through the insulating substrate adjacent to the inner periphery of the magnetic core, the inner conductive connectors respectively defining electrical connections between respective upper conductive traces and respective lower conductive traces; and
outer conductive connectors extending through the insulating substrate adjacent to the outer periphery of the magnetic core, the outer conductive connectors respectively defining electrical connections between respective upper conductive traces and respective lower conductive traces; and
arranging the inner conductive connectors of the auxiliary winding in a plurality of curved rows, each of the plurality of curved rows being positioned at a constant or substantially constant distance from the inner periphery of the cavity.

20. The method of claim 19, further comprising spacing the auxiliary winding apart from the second winding so that electrical isolation is provided between the auxiliary winding and the second winding.

* * * * *